United States Patent

[11] 3,607,996

[72] Inventor Alexander B. Pickands
 325 West Huron St., Chicago, Ill. 60610
[21] Appl. No. 879,532
[22] Filed Nov. 24, 1969
[45] Patented Sept. 21, 1971

[54] METHOD OF PROCESSING DENTURES
 4 Claims, No Drawings

[52] U.S. Cl. ..................................... 264/16,
 18/33, 32/2, 264/17, 264/236
[51] Int. Cl. ..................................... A61c 13/00
[50] Field of Search ........................... 264/16, 17;
 32/2; 18/5.7, 17 D, 32-33

[56] References Cited
 UNITED STATES PATENTS
2,205,488  6/1940  Merrick ..................... 264/17
2,228,059  1/1941  Lee ........................... 264/17
2,333,833  11/1943  Tryfus ....................... 264/17
2,899,712  8/1959  Smith ........................ 32/2

Primary Examiner—Robert F. White
Assistant Examiner—Gene Anville
Attorney—Edward C. Threedy ABSTRACT: A method of processing dentures wherein the physical-chemical volumetric expansion and contraction of the polymerization investing compound is controlled by utilizing layered silicone to separate the denture resins from the mold surfaces and by removing the resin-filled plaster or stone casts as a unitary unit from the compression flask, placing said unit under yieldable pressure and subjecting such unit to a predetermined pressure and temperature for completing its curing cycle within a shortened period of time.

METHOD OF PROCESSING DENTURES

SUMMARY OF THE INVENTION

A method of processing dentures wherein the steps comprise forming the mold or cast in any prescribed manner; after the boil out, coating the opposing surfaces of the mold with a silicone rubber; filling the mold with resins or dental base to form a packed case; flasking the two halves of the packed case; removing the case as a single unit from the flask and placing the same under resilient compression; placing the case into a pressure vessel and filling the vessel with heated liquid; continuing heating of the pressure vessel to a temperature not to exceed 164°; cooling the pressure vessel; and depressurizing and removing the case therefrom when the resin or dental investing material is cured.

GENERAL DESCRIPTION

The inventive process to be hereinafter described is directed to the method of processing dentures which is employed after the initial mold is fabricated and boiled out.

In the process, either or both of the mold (upper and lower) surfaces have applied thereto a thin coating of a water impervious inert separating film, such as silicone rubber, the purpose of which is to enable the separation of the mold or cast pieces after the investing medium has been introduced therebetween and cured.

In accordance with the process hereinafter described, an all-silicone rubber denture mold may be utilized without departing from the process.

After the molds or casts have been boiled out and their respective surfaces coated with the separating film, the voids therebetween are filled with a temperature curing investing medium. The mold is then placed into a pressure flask and completely closed. The confinement of the molds or casts within the flask under pressure insures the proper filling of the void therebetween by the investing medium. However, if the investing medium or denture resins are allowed to cure within the closed flask, no volumetric expansion or contraction is accommodated during the curing period and, in the event that the flask has been overpacked, the expansion and contraction will compress and open the bite of the dentures or affect the same with undesirable conditions.

During the processing of dentures, it is well to keep in mind the fact that volume changes are constantly taking place in the material within the flask, first during the preliminary heat-up stage, when expansion occurs, and, second, after the polymerization occurs, when contraction takes place. There is a gradual increase in the volume of the material as the temperature rises. It will be noted that at the expiration of 20 minutes, if the temperature has risen to approximately 140° F. the volumetric expansion of the material within the flask is approximately 4 percent.

It is further observed that after the resin is heated to about 165° F., the expansion abruptly changes into a contraction, which occurs during and as a result of the polymerization of the material. This contraction in the acrylic resin occurs even though the temperature of the polymerized resin continues to rise. From this it can be seen that whereas the first type of volumetric change, namely, the expansion of the material, is the result of thermal expansion, the second volumetric change is due to the shrinkage which accompanies the physical-chemical reaction when the material changes from a soft-doughy state to a hard, polymerized condition. Provision, therefore, must be made for the contraction and expansion of the material within the flask.

In the present process, after the case or mold has been flasked, it is removed therefrom as a single unit and placed under resilient compression, such as by elastic bands or the like which encircle the same. The case is then placed into a pressure vessel, with the pressure vessel being filled with hot water having a temperature of 180° to 200° F. The introduction of the case in the water and the charging of the pressure vessel with upwards of 20 lb. of air pressure will immediately substantially reduce the temperature thereof to approximately 140° F., a desirable reaction. The vessel is then placed in a heating element until the pressure has been raised to approximately 24 lb. and the temperature does not exceed 164° F. With a rise of both pressure and temperature within the pressure vessel, the curing cycle of the temperature monomer will have been triggered off. When the pressure reaches 24 lb., the temperature within the plaster halves will have risen to approximately 153°–164° F. within which range the curing or polymerization of the temperature cured monomer is triggered off. It is within this range that the curing or polymerization of the temperature cured monomer is effected.

The injection of pressure into the pressure vessel, such as the initial 20 lb., forces any gases or atmospherical pockets in the investing medium into solution, thus substantially reducing any and all traces of residue monomer.

After the pressure and temperature limits are reached, the vessel is removed from the heating element and permitted to cool. As the temperature drops, so will the pressure proportionately be reduced until such time as the investing material is cured, which should be accomplished within 30 minutes' time, as compared to 1 hour or 1½-hour's time required under other methods.

The process can be utilized during the curing cycle of a self-cured resin, with the exception that when such investing medium is used, the compressed resiliently held casts are placed under 30 lb. pressure without the addition of any external heat.

The completed denture is recovered by removing the resilient compression from the mold pieces and opening the same, at which time the cured dentures may be readily separated from the mold by reason of the separating film of silicone rubber which has been introduced between the mold faces and the investing medium.

Dentures fabricated under this method have been found to have a superior texture and improved accuracy.

The various advantages and objects of the invention may be accomplished by modifications of the particular method and embodiment specifically described herein, and it is intended that the appended claims shall include all equivalent arrangements and methods coming within their call.

Having thus described my invention, what I claim as new and desire to protect by Letters Patent is:

1. A method of making a denture from a mold or master cast including the steps of
    a. coating the molding surfaces with a separating film prior to the introduction therein of the investing medium,
    b. introducing a temperature curing investing medium into the cast,
    c. flasking the invested cast to completely fill the mold surfaces thereof,
    d. removing the cast from the flask and placing the cast under resilient compression,
    e. placing the resiliently compressed cast in a fluid-filled pressure vessel under pressure,
    f. placing the pressure vessel upon a heating unit for heating the same to cure the investing medium,
    g. removing the pressure vessel from the heating unit to cool the cast under pressure,
    h. and depressurizing and removing the cast from the pressure vessel and separating the mold for removal of the denture therefrom.

2. A method of making a denture as defined by claim 1 wherein the resilient compression of the deflasked cast will permit volumetric expansion and contraction of the investing medium during its polymerization, and wherein the pressure vessel is charged to 24 lb. pressure during the heating of the fluid therein.

3. A method of making a denture as defined by claim 1 wherein the resiliently compressed cast is placed in a preheated fluid-filled pressure vessel and is heated to a temperature in the range of 150° to 164° F. for polymerization of the temperature cured investing medium.

4. A method of making a denture as defined by claim 2 wherein the resiliently compressed cast is placed in a preheated fluid-filled pressure vessel and is heated to a temperature in the range of 150° to 164° F. for polymerization of the temperature cured investing medium.